United States Patent
Zhang et al.

(10) Patent No.: US 9,325,027 B2
(45) Date of Patent: Apr. 26, 2016

(54) PREPARATION METHOD OF FLUORINE-CONTAINING IONOMER COMPOSITE MATERIAL WITH ION EXCHANGE FUNCTION

(71) Applicant: SHANGDONG HUAXIA SHENZHOU NEW MATERIAL CO., LTD., Zibo, Shangdong (CN)

(72) Inventors: Yongming Zhang, Zibo (CN); Junke Tang, Zibo (CN); Ping Liu, Zibo (CN); Heng Zhang, Zibo (CN); Jun Wang, Zibo (CN)

(73) Assignee: Shandong Huazia Shenzhou New Material Co., Ltd., Zibo Shandong (CN)

(*) Notice: Subject to any disclaimer, the term of this patent is extended or adjusted under 35 U.S.C. 154(b) by 0 days.

(21) Appl. No.: 14/663,320

(22) Filed: Mar. 19, 2015

(65) Prior Publication Data

US 2015/0194691 A1 Jul. 9, 2015

Related U.S. Application Data

(62) Division of application No. 13/805,327, filed as application No. PCT/CN2010/000895 on Jun. 18, 2010, now Pat. No. 9,012,106.

(51) Int. Cl.
| | |
|---|---|
| *H01M 8/10* | (2006.01) |
| *B01D 69/10* | (2006.01) |
| *C08J 5/22* | (2006.01) |
| *B01D 71/82* | (2006.01) |
| *B01D 69/14* | (2006.01) |
| *B01D 71/32* | (2006.01) |

(52) U.S. Cl.
CPC .............. *H01M 8/1048* (2013.01); *B01D 69/10* (2013.01); *B01D 69/141* (2013.01); *B01D 71/82* (2013.01); *C08J 5/2281* (2013.01); *C08J 5/2293* (2013.01); *H01M 8/106* (2013.01); *H01M 8/1039* (2013.01); *H01M 8/1044* (2013.01); *H01M 8/1072* (2013.01); *B01D 71/32* (2013.01); *B01D 2323/30* (2013.01); *B01D 2325/42* (2013.01); *C08J 2327/18* (2013.01); *H01M 8/1023* (2013.01); *H01M 2008/1095* (2013.01); *H01M 2300/0082* (2013.01); *Y02E 60/523* (2013.01); *Y02P 70/56* (2015.11)

(58) Field of Classification Search
CPC ............ H01M 8/1048; H01M 8/1044; H01M 8/1039; H01M 8/106; H01M 8/1072; H01M 8/1023; B01D 69/10; B01D 69/141; B01D 71/32; B01D 71/82; B01D 2323/30; B01D 2325/42; C08J 5/2281; C08J 5/2293; C08J 2327/18
USPC .................................... 521/27; 429/492, 494
See application file for complete search history.

(56) References Cited

U.S. PATENT DOCUMENTS

| | | | |
|---|---|---|---|
| 2005/0131097 A1* | 6/2005 | Jing | ........................ C08F 14/18 522/1 |
| 2006/0281824 A1 | 12/2006 | Asano et al. | |

FOREIGN PATENT DOCUMENTS

| | | |
|---|---|---|
| CN | 101350414 A | 1/2009 |
| CN | 101350418 A | 1/2009 |
| CN | 100580987 C | 1/2010 |
| CN | 101733016 A | 6/2010 |
| EP | 1796194 A1 | 6/2007 |
| JP | 2003261697 A | 9/2003 |
| JP | 2005307026 A | 11/2005 |
| WO | WO 2006/028292 A1 | 3/2006 |

OTHER PUBLICATIONS

EPO machine translation of the detailed description of CN 101350414 (Jan. 2009).
EPO machine translation of the claims of CN 101733016 (Jun. 2010).
International Search Report completed Feb. 24, 2011 and mailed Mar. 24, 2011, corresponding to PCT/CN2010/000895, 6 pages, including English translation.
Zhai et al., "Perfluorinated polymer film with functional group prepared by radiation-induced grafting" European Polymer Journal 45, Mar. 14, 2009, pp. 1668-1673.

* cited by examiner

*Primary Examiner* — Michael M Bernshteyn
(74) *Attorney, Agent, or Firm* — Lewis Roca Rothgerber Christie LLP

(57) ABSTRACT

The present provides a method for preparing a composite material, wherein the method comprises the following steps: (1) compounding a dispersion solution of an ion exchange resin containing a free radical initiator and a high-valence metal compound, with a functional monomer-grafted porous fluoropolymer membrane with a microporous structure by performing solution pouring, tape casting, screen printing process, spraying, or impregnating process; (2) subjecting a wet membrane to heat treatment at 30~300° C., so that the free radical initiator can initiate crosslinking reaction between the porous membrane and the resin to obtain the composite material.

20 Claims, 2 Drawing Sheets

PREPARATION METHOD OF FLUORINE-CONTAINING IONOMER COMPOSITE MATERIAL WITH ION EXCHANGE FUNCTION

CROSS-REFERENCE TO RELATED APPLICATION

The present application is a divisional application of U.S. patent application Ser. No. 13/805,327 filed on Dec. 18, 2012, the entire contents of which are incorporated herein by reference.

TECHNICAL FIELD

The present invention belongs to the field of functional polymer composite materials, and relates to a preparation method of fluorine-containing ionomer composite material with ion exchange function.

BACKGROUND TECHNOLOGIES

Proton Exchange Membrane Fuel Cell is a power generation device which directly converts chemical energy into electrical energy in an electrochemical manner, and is considered to be the most preferred clean and efficient power generation technology in the 21st century. Proton Exchange Membrane (PEM) is a key material for use in Proton Exchange Membrane Fuel Cell (PEMFC).

The perfluorosulfonic acid proton exchange membranes currently used have a good proton conductivity and chemical stability at a relatively low temperature (8 0° C.) and highhumidity. However, they have many shortcomings, such as poor dimensional stability, low mechanical strength, bad chemical stability and so on. The membrane has different water absorption under different humidities, resulting in different expansion in size, when the membrane transforms under different operation conditions, the size of the membrane changes accordingly. Such case is repeated over and over again then mechanical damage is eventually caused to the proton exchange membrane. Moreover, a large number of substances with strong oxidability, such as hydroxyl radicals and hydrogen peroxides, are produced in a reaction at the positive electrode of a fuel cell, and these substances will attack the non-fluoro groups in the membrane-forming resin molecules, leading to chemical degradation, damage and blistering of the membrane. Finally, when the operating temperature of the perfluorosulfonic acid exchange membrane is higher than 90° C., the proton conductivity of the membrane is decreased sharply due to rapid dehydration of the membrane, thereby decreasing efficiency of the fuel cell greatly. However, high operating temperature can greatly improve the resistance of the fuel cell catalyst to carbon monoxides. In addition, the existing perfluorosulfonic acid membranes have some hydrogen or methanol permeability, especially in a direct methanol fuel cell, permeability of methanol is very high, which becomes a fatal problem. Therefore, how to improve strength of a perfluorosulfonic acid proton exchange membrane, dimensional stability, and efficiency of proton conduction at a high temperature and to reduce permeability of the working medium and the like becomes a major issue that the fuel cell industry faces.

At present, some methods have been proposed to solve these problems. For example, Japanese Patent No. JP-B-5-75835 enhances strength of a membrane by impregnating a porous media made of polytetrafluoroethylene (PTFE) with a perfluorosulfonic acid resin. However, this porous PTFE medium still cannot solve the problems above due to relative softness and insufficient reinforcing effect of the PTFE material. W. L. Gore Co., Ltd developed composite membrane liquid of Gore-Select series by filling Nafion ion conductive liquid with the porous Teflon (U.S. Pat. No. 5,547,551, U.S. Pat. No. 5,635,041, U.S. Pat. No. 5,599,614). This membrane has high proton conductivity and better dimensional stability, however, Teflon has large creep at a high temperature, resulting in performance degradation. Japanese Patent No. JP-B-7-68377 also proposes a method in which a porous media made of polyolefin is filled with a proton exchange resin, but such membrane has insufficient chemical durability and thus there is a problem in long-term stability. Furthermore, due to addition of the porous medium without proton conductivity, the number of proton-conduction pathways is reduced, and proton exchange capability of the membrane is decreased.

Furthermore, Japanese Patent No. JP-A-6-231779 proposes another method for reinforcement by using fluorine resin fibers. The membrane made by this method is an ion exchange membrane which is reinforced through the reinforcing material of a fluorocarbon polymer in the form of fibrils. However, in this method, it is required to add a relatively large amount of the reinforcing material; in this case, processing of the membrane tends to be difficult and electrical resistance of the membrane may likely increase.

European Patent No. EP0875524B1 discloses a technology of reinforcing nafion membrane by using glassfiber membrane prepared by applying glass fiber nonwoven technology. Oxides such as silica are also mentioned in this patent. However, non-woven glass fiber cloth is a necessary substrate in this patent, which would greatly limit the application scope of reinforcement.

U.S. Pat. No. 6,692,858 discloses a technology in which a perfluorosulfonic acid resin is reinforced by polytetrafluoroethylene fibers. In this technology, the perfluorosulfonyl fluoride resin and the polytetrafluoroethylene fiber are mixed, extruded, and transformed to prepare a fiber-reinforced perfluorosulfonic acid resin. The method cannot be applied in continuous production due to the time-consuming transformation process.

CN200810638706.9 discloses a process route for preparing a crosslinked fluorine-containing sulfonic acid proton exchange membrane by using a fluorine-containing sulfonic acid resin copolymerized with a bromine- or iodine-containing perfluoromonomer under certain conditions, the membrane prepared by the method has high strength and good dimensional stability.

However, the porous membrane or fiber is only simply mixed with a resin in the above technologies, since the nature of the membrane or fiber differs greatly from the membrane-forming resin, even they are mutually exclusive, it is extremely easy to form gaps between the membrane-forming molecules and reinforcing object, sometimes some pores of the reinforced microporous membrane cannot be filled with the resin. Thus, such a membrane often has high gas permeability, and when the membrane is working in the fuel cell, high permeability tends to result in the energy loss and damage to the cell caused by overheating.

SUMMARY OF THE INVENTION

One object of the present invention is to provide a composite material which is formed by compounding an ion exchange resin with a porous fluoropolymer membrane, wherein the ion exchange resin and the functional monomers grafted on the porous fluoropolymer membrane form a carbon-chain crosslinked structure, so that the composite material has excellent mechanical properties and gas impermeability, as well as high ion exchange capacity and electrical conductivity. Another object of the present invention is to provide a method for preparing said composite material. Yet another object of the present invention is to provide an ion exchange membrane made from the above-mentioned composite material. Still another object of the present invention is to provide a fuel cell containing the above-mentioned ion exchange membrane. And still yet another object of the present invention is to provide a use of the above-mentioned composite material.

The above-mentioned objects of the present invention can be achieved by adopting the following technical schemes.

In one aspect, the present invention provides a composite material which is formed by filling micropores and covering surface of a porous fluoropolymer membrane with one or more ion exchange resins having an ion exchange function; wherein pore surfaces of the porous fluoropolymer membrane are modified by bromine-containing functional monomers through grafting; and at least one of the ion exchange resins forming the composite material can form a carbon-chain crosslinked structure with functional monomers grafted on the porous fluoropolymer membrane.

Preferably, said bromine-containing functional monomer is one or more combinations selected from a group consisting of substances as defined in the following formula (V) and/or formula (VI):

(V)

(VI)

wherein a', b', c' are 0 or 1, respectively, and a'+b'+c'≠0; n' is 0 or 1; $X_1$ is selected from F or Br; and $R_{f4}$, $R_{f5}$, $R_{f6}$ are selected from perfluorinated alkyls, respectively.

Preferably, the ion exchange resin of said composite material is prepared by copolymerization of fluorine-containing olefins, fluorine-containing olefin monomers comprising a functional group and fluorine-containing olefin monomers containing a crosslinking site and/or mixtures of the above-obtained copolymers, and has an EW value of 600~1,300, preferably 700~1,200; the number average molecular weight of said resin is 150,000~450,000.

Wherein, preferably, the fluorine-containing olefin is one or more selected from a group consisting of tetrafluoroethylene, chlorotrifluoroethylene, trifluoroethylene, hexafluoropropylene and/or vinylidene fluoride; more preferably tetrafluoroethylene and/or chlorotrifluoroethylene;

the fluorine-containing olefin monomer containing a functional group is one or more selected from a group consisting of substances as defined in the following formula (II) and/or formula (III) and/or formula (IV):

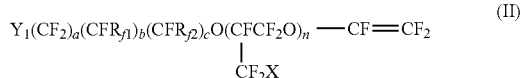
(II)

$R_{f3}CF=CF(CF_2)_dY_2$ (III)

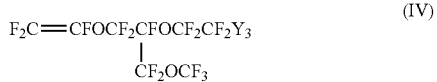

wherein a, b, c are an integer of 0~1, respectively, but shall not be zero at the same time;

d is an integer of 0~5; n is 0 or 1;

$R_{f1}$, $R_{f2}$, $R_{f3}$ are selected from perfluorinated alkyl or chlorofluorinated alkyl, respectively; X is selected from F or Br;

$Y_1$, $Y_2$, $Y_3$ are selected from $SO_2M$, $COOR_3$ or $PO(OR_4)(OR_5)$, respectively, wherein M is selected from F, Cl, OR, or $NR_1R_2$; R is selected from methyl, ethyl or propyl, or selected from H, Na, Li, K or ammonium; $R_1$ and $R_2$ are selected from H, methyl, ethyl or propyl, respectively; $R_3$ is selected from H, Na, Li, K, ammonium, methyl, ethyl or propyl; and $R_4$, $R_5$ are selected from H, Na, Li, K, or ammonium, respectively;

the fluorine-containing olefin monomer containing a crosslinking site is one or more selected from a group consisting of substances as defined in the following formula (V) and formula (VI):

(V)

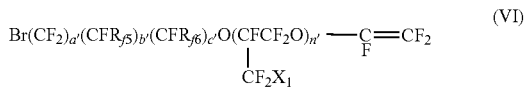
(VI)

wherein a', b', c' are 0 or 1, respectively, but a'+b'+c'≠0; $X_1$ is selected from F or Br; n' is 0 or 1; and $R_{f4}$, $R_{f5}$, $R_{f6}$ are selected from perfluorinated alkyl, respectively.

Preferably, material of the porous fluoropolymer membrane in said composite material is selected from porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane, which maybe uniaxial tensile membranes or biaxial tensile membranes; and the porous fluoropolymer membrane has a thickness of no greater than 100 μm, a porosity of 50~97% and a pore size of 0.1~10 μm; preferably, the porous fluoropolymer membrane has a thickness of 5~20 μm, a porosity of 60~97%, and a pore size of 0.2~5 μm.

Preferably, said composite material may further contain a high-valence metal compound, part of acidic exchange groups of the ion exchange resin form physical bonding in between through the high-valence metal compound; preferably, the high-valence metal compound forming the physical bonding is one or more combinations selected from a group consisting of compounds of the following elements: W, Zr, Ir, Y, Mn, Ru, Ce, V, Zn, Ti, and La; more preferably, the high-valence metal ion compound is selected from nitrates, sulfates, carbonates, phosphates, acetates of these metal elements in the highest valence state and intermediate valence state or doulbe salts thereof; or one or more selected from a group consisting of cyclodextrins, crown ethers, acetylacetones, aza crown ethers and nitrogen heterocyclic rings, EDTA, DMF, and DMSO complexes of these metal elements in the highest valence state and intermediate valence state; or selected from a group consisting of hydroxides of these metal elements in the highest valence state and intermediate valence state; or selected from a group consisting of oxides of these metal elements in the highest valence state and intermediate valence state which have a perovskite structure, including but not limited to the following compounds: $Ce_xTi_{(1-x)}O_2$ (x=0.25~0.4), $Ca_{0.6}La_{0.27}TiO_3$, $La_{(1-y)}Ce_yMnO_3$ (y=0.1~0.4) and $La_{0.7}Ce_{0.15}Ca_{0.15}MnO_3$; preferably, the high-valence metal compound is added in an amount of 0.0001~5 wt %, preferably 0.001~1 wt % of the resin.

In another aspect, the present invention provides a method for preparing the above-mentioned composite material, which comprises initiating the functional monomers grafted on the porous membrane and bromine atoms of the resin by a free radical initiator to generate free radicals, and forming a carbon-chain crosslinked structure between the porous membrane and the resin through coupling between the free radicals;
wherein the initiator is one or more selected from a group consisting of organic peroxide initiators and/or azo initiators; wherein the peroxide initiators are initiators as defined in the following formula (VIII) and/or formula (IX):

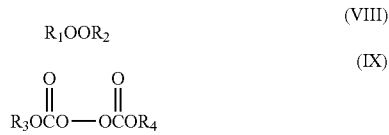

(VIII)
(IX)

$R_1$, R are selected from but not limited to the following groups, respectively: H, C1~C20 alkyl or aryl-substituted alkyl, C1~C20 acyl, C1~C20 aroyl, C1~C20 fluorinated alkyl or perfluorinated alkyl or aryl substituted alkyl, C1~C20 fluorinated acyl or perfluorinated acyl, and/or C1~C20 fluorinated aroyl or perfluorinated aroyl; but $R_1$ and $R_2$ are not H at the same time;
$R_3$, $R_4$ are selected from but not limited to the following groups, respectively: C1~C20 alkyl or aryl-substituted alkyl and/or C1~C20 fluorinated alkyl or perfluorinated alkyl or aryl substituted alkyl;
the azo initiator is selected from but not limited to the following initiators: azodicarbonamide, azobisisobutyronitrile, azobisisovaleronitrile, azobisisoheptonitrile, dimethyl 2,2'-azobis(2-methylpropionate), 1-((cyano-1-methylethyl)azo)formamide, 1,1'-azo(cyclohexyl-1-cyano), 2,2'-azobis(2-methylpropionamidine)dihydrochloride, and/or 4,4'-azobis(4-cyanovaleric acid);
preferably, the free radical initiator is an organic peroxide initiator, and more preferably is an organic perfluorinated peroxide; for the method of forming crosslinking, please refer to U.S. Pat. No. 3,933,767 and EP1464671A1; the free radical initiator is added in an amount of 0.1~1 wt % of the resin.

Preferably, the method for preparing the composite material containing a high-valence metal ion compound comprises the following steps:
(1) Compounding a dispersion solution of the ion exchange resin containing free radical initiator and high-valence metal compound with the functional monomer-grafted porous fluoropolymer membrane with a microporous structure by performing solution pouring, tape casting, screen printing process, spraying, or impregnating process;
(2) Subjecting a wet membrane to heat treatment at 30~300° C. so that the free radical initiator can initiate crosslinking reaction between the porous membrane and the resin to obtain the composite material;
wherein a solvent used in the processes of solution pouring, tape casting, screen printing, spraying, impregnating and other processes, is selected from one or more of a group consisting of dimethylformamide, dimethylacetamide, methylformamide, dimethylsulfoxide, N-methylpyrrolidone, hexamethylphosphoric acid amine, acetone, water, ethanol, methanol, (n-)propanol, isopropanol, ethylene glycol and/or glycerol; preparation is performed under the following conditions: concentration of the resin dispersion solution being 1~80%, temperature of heat treatment being 30~300° C., and time of heat treatment being 1~600 minutes; preferably under the following conditions: concentration of the resin dispersion solution being 5~40%, temperature of heat treatment being 120~250° C., and time of heat treatment being 5~200 minutes; preferably, the initiator is added in an amount of 0.1~1 wt % of the resin, and the high-valence metal compound is added in an amount of 0.0001~5 wt %, preferably 0.001~1 wt % of the resin.

In yet another aspect, the present invention provides an ion exchange membrane made from the above-mentioned composite material.

In still another aspect, the present invention provides a fuel cell containing the above-mentioned ion exchange membrane.

In still yet another aspect, the present invention provides a use of the above-mentioned composite material in manufacturing an ion exchange membrane of a fuel cell.

Compared with the prior art, the present invention has at least the following advantages:
in the composite material of the present invention, there is at least one ion exchange resin containing bromine, and the bromine of the ion exchange resin and the bromine grafted on the porous membrane form a carbon-chain crosslinked structure. Due to formation of the carbon-chain crosslinked structure, the composite material can form a tight integral structure. In a preferred embodiment, a physical bond crosslinked structure is formed between the high-valence metal and the acidic group in the ion exchange resin. Therefore, the ion exchange membrane made from the composite material of the present invention has a high ion exchange capacity, as well as good mechanical strength, gas impermeability and stability. Compared with the ion exchange membranes made from ordinary composite materials, the ion exchange membrane made from the composite material of the present invention is superior to the ordinary ion exchange membranes in terms of performances such as electrical conductivity, tensile strength, hydrogen permeation current, and dimensional change rate.

The following is detailed description of the present invention.

The perfluorosulfonic acid ion membrane used in a fuel cell needs to meet the following requirements: being stable, having high electrical conductivity and high mechanical strength. Generally, with an increase of ion exchange capacity, the Equivalent Weight (EW) value of the perfluoropolymer decreases (when the EW value decreases, the Ion Exchange Capacity (IEC)=1,000/EW) and the strength of the membrane also decreases in the meanwhile. Gas permeability of the membrane will also rise accordingly, which will bring very serious effects to fuel cells. Therefore, preparing the membrane having a high ion exchange capacity, as well as good mechanical strength, gas impermeability and stability is the key in practical applications of fuel cells, especially fuel cells in delivery vehicles such as automobiles.

In view of the deficiencies existing in the prior art, the present invention provides a composite material and method for preparing the composite material. The composite material provided in the present invention uses porous membrane as a reinforcing material, which changes the previous method of simply filling the ion exchange resin into the porous membrane structure by forming a carbon-chain crosslinked structure between the porous membrane and the ion exchange resin (as shown in FIG. 1) The membrane obtained has very high mechanical properties and gas impermeability.

The present invention provides a composite material which is characterized in that:

(a) Said composite material is formed by filling micropores and covering surfaces of a porous fluoropolymer membrane with one or more ion exchange resins having an ion exchange function;

(b) The pore surfaces of said porous fluoropolymer membrane are modified by bromine-containing functional monomers through grafting; and (c) At least one of the ion exchange resins forming the composite material can form a carbon-chain crosslinked structure with the functional monomers grafted on the porous fluoropolymer membrane.

The selected porous fluoropolymer membrane with a microporous structure grafted with a substance with ion exchange function has a thickness of no greater than 100 μm, a porosity of 50~97% and a pore size of 0.1~10 μm; preferably, the porous fluoropolymer membrane has a thickness of 5~20 μm, a porosity of 60~97% and a pore size of 0.2~5 μm. These porous fluoropolymer membranes are characterized in that: the material of the porous fluoropolymer membrane is selected from porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane. These membranes may be uniaxial tensile membranes or biaxial tensile membranes.

A graft reaction occurs between bromine-containing functional monomers and porous fluoropolymer membrane in the presence of plasma and the resulting chemical bonding crosslinked network structure is shown in the following formula (I):

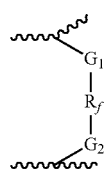

(I)

wherein $G_1=CF_2$ or O; $G_2=CF_2$ or O; and $R_f$ is a C2-C10 perfluorinated carbon chain or chlorine-containing perfluorinated carbon chain.

The bromine-containing functional monomer grafted on the porous membrane is one or more selected from substances as defined in the following formula (V) and formula (VI):

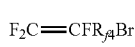

(V)

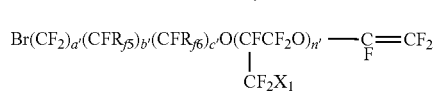

(VI)

wherein a', b', c' are 0 or 1, respectively, but a'+b'+c'≠0; $X_1$ is selected from F or Br; n' is 0 or 1; and $R_{f4}$, $R_{f5}$, $R_{f6}$ are selected from fluorine or perfluorinated alkyl, respectively.

The method for modifying the porous membrane with the above-mentioned monomer is a plasma method, which has been disclosed in many publications, specifically, please refer to polyvinylidene fluoride (PVDF) nanofiber modified and grafted by plasma as disclosed in Page 33, Journal of Tianjin Polytechnic University, 2008, Vol. 27, Iss. 5.

Said fluorine-containing ion exchange resin of the present invention is prepared by copolymerization of fluorine-containing olefins, one or more fluorine-containing olefin monomers comprising a functional group and one or more fluorine-containing olefin monomers containing a crosslinking site, or mixtures of the above-obtained copolymers, the fluorine-containing ion exchange resin has a EW value of 600~1,300, preferably 700~1,200, and a number average molecular weight of 150,000~450,000.

The fluorine-containing olefin is one or more selected from a group consisting of tetrafluoroethylene, chlorotrifluoroethylene, trifluoroethylene, hexafluoropropylene and/or vinylidene fluoride; preferably selected from tetrafluoroethylene and/or chlorotrifluoroethylene.

The fluorine-containing olefin monomer containing a functional group is one or more selected from a group consisting of monomers as defined in the following formula (II), formula (III) and formula (IV):

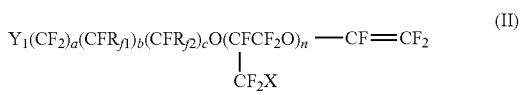

(II)

(III)

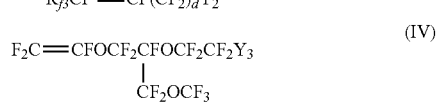

(IV)

wherein a, b, c are an integer of 0~1, respectively, but shall not be zero at the same time;
d is an integer of 0~5;
n is 0 or 1;
$R_{f1}$, $R_{f2}$, $R_{f3}$ are selected from perfluorinated alkyl or chlorofluorinated alkyl, respectively;
X is selected from F or Br;
$Y_1$, $Y_2$, $Y_3$ are selected from $SO_2M$, $COOR_3$ or $PO(OR_4)(OR_5)$, respectively, wherein M is selected from F, Cl, OR, or $NR_1R_2$; R is selected from methyl, ethyl or propyl, or selected from H, Na, Li, K or ammonium; $R_1$ and $R_2$ are selected from H, methyl, ethyl or propyl, respectively; $R_3$ is selected from H, Na, Li, K, ammonium, methyl, ethyl or propyl; R4, R5 are selected from H, Na, Li, K, or ammonium, respectively.

The fluorine-containing olefin monomer containing a crosslinking site is one or more selected from a group consisting of monomers as defined in the following formula (V) and/or formula (VI):

(V)

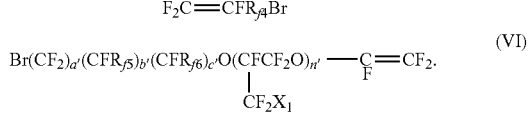

(VI)

wherein a', b', c' are 0 or 1, respectively, but a'+b'+c'≠0;
$X_1$ is selected from F or Br;
n' is 0 or 1; and
$R_{f4}$, $R_{f5}$, $R_{f6}$ are selected from fluorine or perfluorinated alkyls, respectively.

Said carbon chain crosslinking means forming a carbon-carbon bond between the functional monomer grafted on the porous fluoropolymer membrane and the ion exchange resin, which are crosslinked together (as shown in FIG. 2).

The method for forming carbon-chain crosslinking between the porous membrane and the membrane-forming resin comprises initiating the functional monomers grafted on the porous membrane and bromine atoms of the resin by a free radical initiator to generate free radicals, then obtaining crosslinked carbon-carbon bonds through coupling between the free radicals; wherein the initiators used include organic peroxide initiators and azo initiators; preferably, the initiator is an organic peroxide initiator; more preferably, the initiator is a perfluorinated organic peroxide initiator.

Said free radical initiators are organic peroxide initiators or azo initiators, or two or more of the free radical initiators to be used synergistically; wherein the peroxide initiators are initiators as defined in the following formula (VIII) and formula (IX):

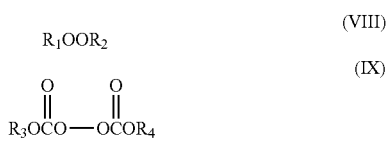

$R_1$, $R_2$ are selected from but not limited to the following groups, respectively: H, C1~C20 alkyl or aryl-substituted alkyl, C1~C20 acyl, C1~0 aroyl, C1~C20 fluorinated alkyl or perfluorinated alkyl or aryl substituted alkyl, C1~C20 fluorinated acyl or perfluorinated acyl, and/or C1~C20 fluorinated aroyl or perfluorinated aroyl; but $R_1$ and $R_2$ are not H at the same time;
$R_3$, $R_4$ are selected from but not limited to the following groups, respectively: C1~C20 alkyl or aryl-substituted alkyl and/or C1~C20 fluorinated alkyl or perfluorinated alkyl or aryl substituted alkyl;
the azo initiator is selected from but not limited to the following initiators: azodicarbonamide, azobisisobutyronitrile, azobisisovaleronitrile, azobisisoheptonitrile, dimethyl 2,2'-azobis(2-methylpropionate), 1-((cyano-1-methylethyl)azo) formamide, 1,1'-azo(cyclohexyl-1-cyano), 2,2'-azobis(2-methylpropionamidine)dihydrochloride, and/or 4,4'-azobis(4-cyanovaleric acid).

In the present invention, a high-valence metal compound is added to the composite material so that part of acidic exchange groups of the ion exchange resin can form physical bonding in between through the high-valence metal compound.

Said high-valence metal compound forming the physical bonding is one or more combinations selected from a group consisting of compounds of the following elements: W, Zr, Ir, Y, Mn, Ru, Ce, V, Zn, Ti, and La;
Said high-valence metal ion compound is one or more selected from a group consisting of nitrates, sulfates, carbonates, phosphates, acetates of these metal elements in the highest valence state and intermediate valence state or double salts thereof. Said high-valence metal ion compound is or selected from a group consisting of cyclodextrins, crown ethers, acetylacetones, aza crown ethers and nitrogen heterocyclic rings, EDTA, DMF, and DMSO complexes of these metal elements in the highest valence state and intermediate valence state. Said high-valence metal ion compound is selected from a group consisting of hydroxides of these metal elements in the highest valence state and intermediate valence state. Said high-valence metal ion compound is selected from a group consisting of oxides of these metal elements in the highest valence state and intermediate valence state which have a perovskite structure, including but not limited to the following compounds: $Ce_xTi_{(1-x)}O_2$ (x=0.25~0.4), $Ca_{0.6}La_{0.27}TiO_3$, $La_{(1-y)}Ce_yMnO_3$ (y=0.1~0.4) and $La_{0.7}Ce_{0.15}Ca_{0.15}MnO_3$. The high-valence metal compound is added in an amount of 0.0001~5 wt %, preferably 0.001~1 wt %.

The method for preparing said composite material containing a high-valence metal compound includes the following steps:
(1) Compounding a dispersion solution of the ion exchange resin containing free radical initiator and high-valence metal compound with the functional monomer-grafted porous fluoropolymer membrane with a microporous structure by performing solution pouring, tape casting, screen printing process, spraying, or impregnating process;
(2) Subjecting a wet membrane to heat treatment at 30~250° C. so that the free radical initiator can initiate crosslinking reaction between the porous membrane and the resin;
(3) Obtaining the composite material after treatment.

The solvent used in the processes of solution pouring, tape casting, screen printing, spraying, impregnating and other processes, is selected from one or more of a group consisting of dimethylformamide, dimethylacetamide, methylformamide, dimethylsulfoxide, N-methylpyrrolidone, hexamethylphosphoric acid amine, acetone, water, ethanol, methanol, (n-)propanol, isopropanol, ethylene glycol and/or glycerol; concentration of the resin solution used is 1~80%, preferably 5~40%; temperature of heat treatment is 30~300° C., preferably 120~250° C.; and time of heat treatment is 1~600 minutes, preferably 5~200 minutes.

In another aspect, the present invention provides an ion exchange membrane made from the above-mentioned composite material.

In yet another aspect, the present invention provides a fuel cell containing the above-mentioned ion exchange membrane.

In still another aspect, the present invention provides a use of the above-mentioned composite material in manufacturing an ion exchange membrane of a fuel cell.

The beneficial effects of the present invention include:

The present invention provides an ion exchange composite material with reinforced porous membrane where a chemical crosslinked structure is formed between the composite base porous membrane and the membrane-forming resin through chemical bonds; in a preferred embodiment, part of the acidic exchange groups in the ion exchange resin form a physical bonding crosslinked network through high-valence metal physical bonding. Since the porous membrane is grafted with functional groups with exchange function, the porous membrane and the ion exchange resin can form a tight integral structure through chemical crosslinking, rather than simply blending ion exchange resin and microporous membrane together in the prior art. The composite material obtained in the present invention has advantages of excellent chemical stability, mechanical properties and gas permeability etc, and the ion exchange membrane provided in the present invention resolves the problems that the conventional microporous composite membrane has poor gas impermeability and the ion exchange resin is easily separated from the microporous membrane.

wherein "1" represents a perfluorinated ion exchange resin, "2" represents a porous membrane, "3" represents a molecule of perfluorinated ion exchange resin, and "4" represents chemical crosslinking.

Figure 1:
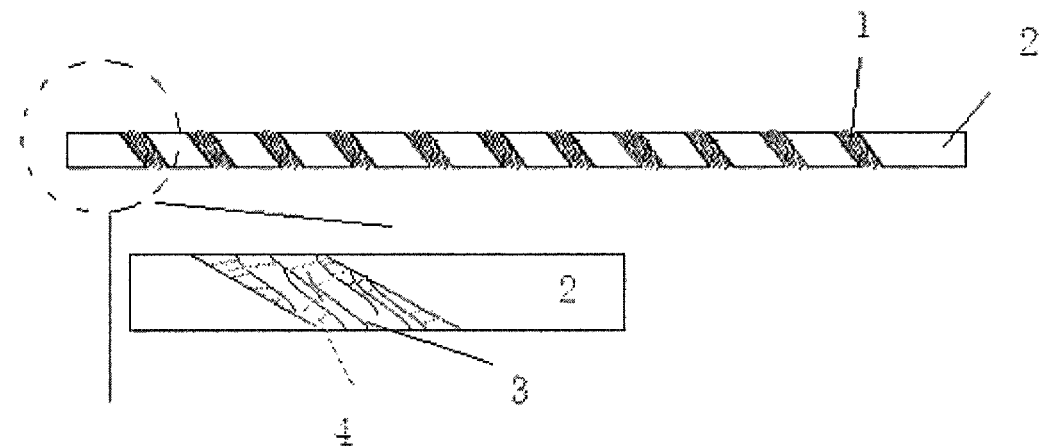
FIG. 1 shows an ion exchange resin with carbon-chain crosslinked on a porous membrane.
Figure 2:
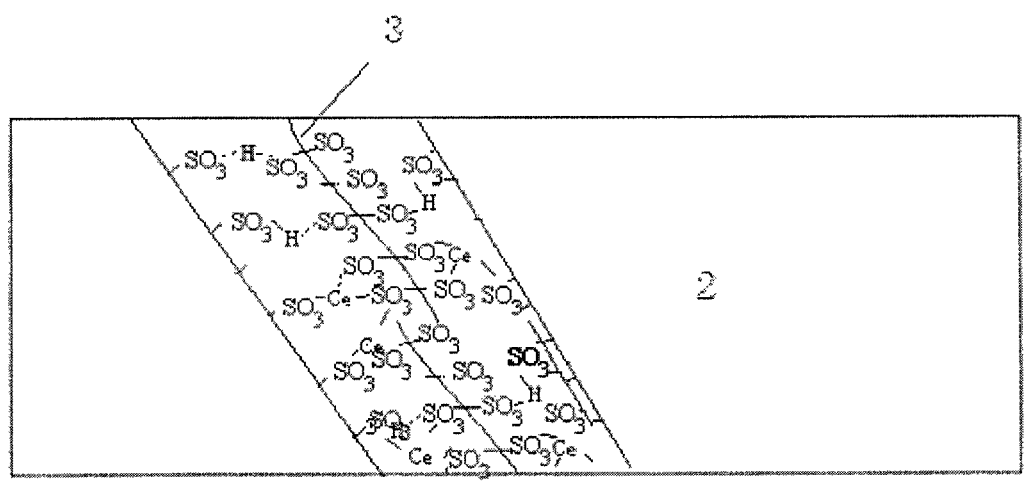
FIG. 2 shows a schematic diagram illustrating carbon-chain crosslinking.
Figure 3:
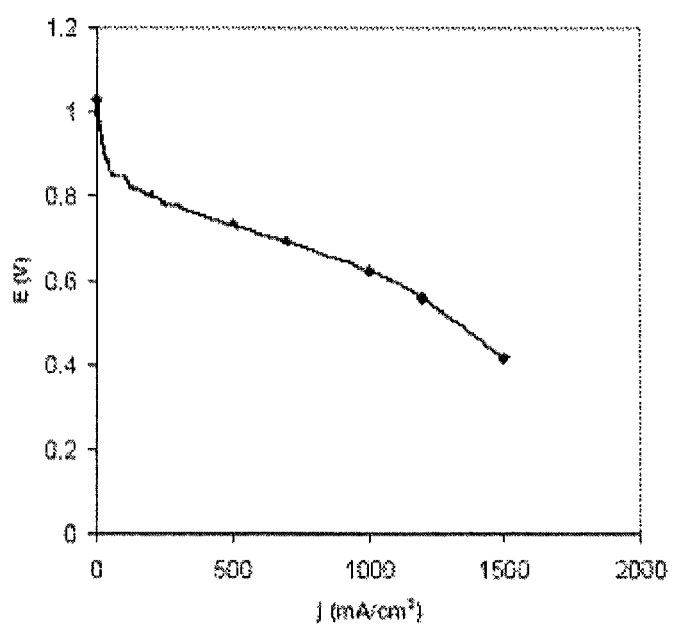

FIG. 3 shows a polarization curve of a single cell.

BEST MODES OF THE PRESENT INVENTION

The present invention will be further illustrated in combination with embodiments, which are not used to limit the present invention.

Example 1

A chqistex polytetrafluoroethylene membrane (bought in Ningbo, China) with a thickness of 18 μm, a porosity of 85% and a pore size of 1 μm was placed in a plasma generator and a plasma generated at a pressure of 1 Pa with Ar as working gas was grafted with the monomer defined in the following formula

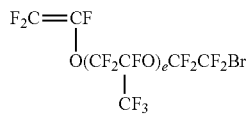

(wherein e=1).

The grafted polytetrafluoroethylene membrane was impregnated in an ethanol-water solution containing 5% cerium (III) nitrate, a trace of 2,2'-azobis-(2-methylbutyronitrile) and 25% perfluorosulfonic acid resin for 10 minutes (wherein the structural formula of the perfluorosulfonic acid resin is shown in the following formula:

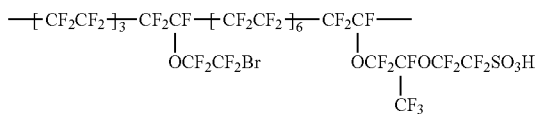

number average molecular weight: 170,000). Then the wet membrane was taken out, and treated at 190° C. for 20 minutes to obtain a composite membrane with a thickness of 19 μm.

Example 2

A (n-)propanol-water mixed solution containing a solution of 15% mixed perfluorosulfonic acid resin, wherein resin A comprising a repeating unit (a):

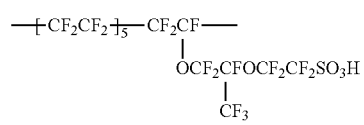

(number average molecular weight: 260,000) and resin B comprising a repeating unit (b):

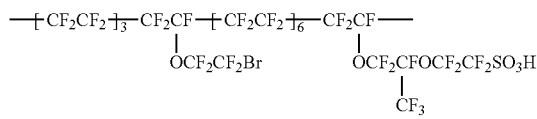

(number-average molecular weight: 170,000) (the mass ratio of the resin A to resin B is 3:1), 3% manganese (II) nitrate and a trace of benzoyl peroxide, was sprayed onto a chqistex polytetrafluoroethylene membrane (bought in Ningbo) with a thickness of 10 μm, a porosity of 80% and a pore size of 0.5 μm which was grafted with a monomer:

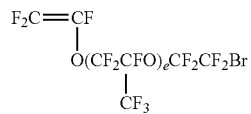

(wherein e=2) according to the graft method in Example 1

Then a sample of the wet membrane was dried at 140° C. for 15 minutes in an oven. In order to block the pores in the membrane completely, this step may be repeated for more than two times. Finally, the composite membrane was treated at 150° C. for 30 minutes to obtain a composite membrane with a thickness of 20 μm.

Example 3

An isopropanol-(n-)propanol-water solution with a mass concentration of 10% was prepared by mixing a perfluorosulfonic acid resin A comprising a repeating unit (a):

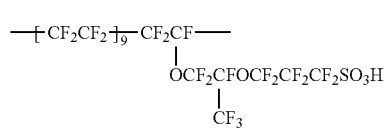

(number average molecular weight: 260,000) and a perfluorosulfonic acid resin B comprising a repeating unit (b):

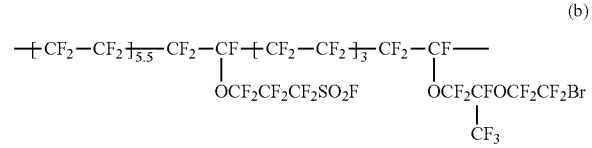

(number average molecular weight: 170,000) (the mass ratio of the resin A to resin B is 5:1); the isopropanol-(n-)propanol-water solution further contained La (III)-DMF complex and a trace of perfluorinated dilauroyl peroxide Then a chqistex polytetrafluoroethylene membrane (bought in Ningbo) with a thickness of 10 μm, a porosity of 90% and a pore size of 2~3 μm grafted with

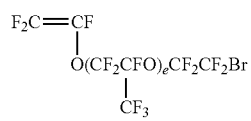

(wherein e=1) according to the graft method in Example 1 was compounded with the above-mentioned isopropanol-(n-)propanol-water solution by following the screen printing method, and the membrane obtained was treated at 180° C. for 5 minutes to obtain a membrane with a thickness of 11 μm.

Example 4

A polyvinylidene fluoride membrane with a thickness of 30 μm, a porosity of 79% and a pore size of 0.22 μm which was grafted with both

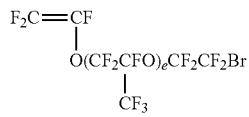

(wherein e=1)
and

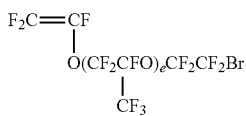

(wherein e=0)

(mass ratio of the two monomers is 1:1) (produced by Zhejiang (Torch) Xidoumen Membrane Industry Co., Ltd, according to the grafting method in Example 1) was impregnated in the DMF solution containing 10% zirconium nitrate, a trace of perfluorinated malonyl peroxide and 5% perfluorosulfonic acid resin, wherein the perfluorosulfonic acid resin has a structural formula formulas:

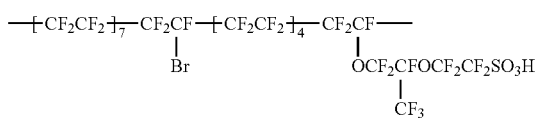

(number average molecular weight: 170,000). Then a sample of the wet membrane was dried at 100° C. for 40 minutes in an oven and then treated at 190° C. for 20 minutes to obtain a composite membrane with a thickness of 31 μm.

Example 5

A chqistex polytetrafluoroethylene membrane (bought in Ningbo) with a thickness of 50 μm, a porosity of 95% and a pore size of 0.5 μm which was grafted with both

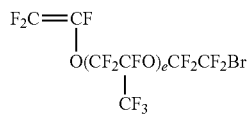

(wherein e=0)
and

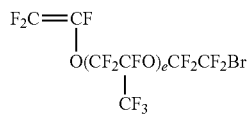

(wherein e=1) (mass ratio of the two monomers is 1:1) according to the grafting method in Example 1 was fixed by a tensioning device around the membrane.

A DMSO solution containing 4% zinc-cyclodextrin complex, a trace of perfluorinated malonyl peroxide and 30% perfluorosulfonic acid resin was sprayed onto both sides of the polytetrafluoroethylene membrane, wherein the perfluorosulfonic acid resin has a structural formula as:

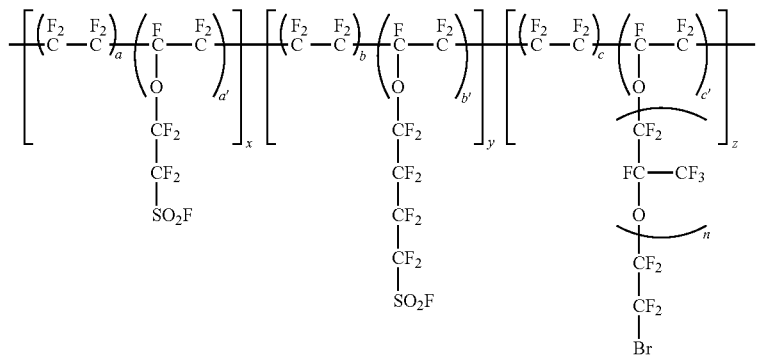

($a=9$; $b=6$; $c=3$; $a'=b'=c'=1$; $n=1$; $x=10$, $y=12$, $z=1$; number average molecular weight: 170,000).

Then a sample of the wet membrane was dried at 160° C. for 10 minutes in an oven. In order to block the pores in the membrane completely, this step may be repeated for more than two times. Finally, the composite membrane was treated at 200° C. for 20 minutes to obtain a composite membrane with a thickness of 50 μm.

Example 6

A porous polyvinylidene fluoride membrane with a thickness of 25 μm, a porosity of 70% and a pore size of 1 μm grafted with two bromine-containing monomers that are the same as those in Example 5 (mass ratio of the two monomers is 2.5:1) according to the grafting method in Example 1 was fixed on a plate after treatment with the solution. And a (n-)propanol-water solution containing 0.01% cerium nitrate, a trace of perfluorinated malonyl peroxide and 20% mixed perfluorosulfonic acid resins, wherein the perfluorosulfonic acid resin A comprises a repeating unit (a)

(a)

(number average molecular weight: 290,000) and the perfluorosulfonic acid resin B comprises a repeating unit (b):

wherein the perfluorosulfonic acid resin A comprises a repeating unit (a):

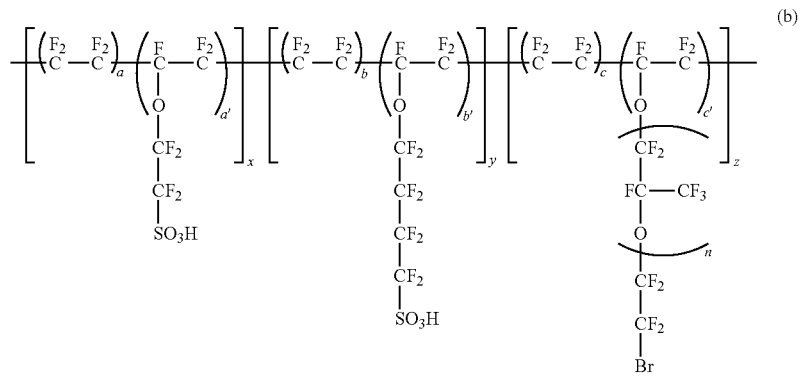

(a=11, b=7, c=5; a'=b'=c'=1; n=1, x=13, y=10, z=1; number average molecular weight: 160,000) (mass ratio of the resin A to resin B is 4:1) was sprayed onto the fixed porous polytrifluorochloroethylene membrane, A sample of the wet membrane was dried at 80° C. for 10 minutes in an oven, then the ion exchange resin contacting the porous polyvinylidene fluoride membrane was pressed into pores of the membrane through the hot pressing process to prepare a composite membrane.

Example 7

A chqistex polytetrafluoroethylene membrane (bought in Ningbo) with a thickness of 10 μm, a porosity of 80% and a pore size of 1 μm which was grafted with both

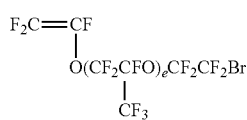

(wherein e=0)
and

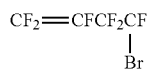

(mass ratio of the two monomers is 1:3) according to the grafting method in Example 1 was fixed by a tensioning device around the membrane. Then an NMP solution containing 5% vanadium sulfate, a trace of perfluorinated malonyl peroxide and 30% mixed perfluorosulfonic acid resins,

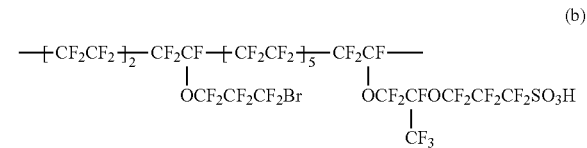

(c=7, d=5, c'=d'=1; number average molecular weight: 260,000)
and the perfluorosulfonic acid resin B comprises a repeating unit (b):

(number average molecular weight: 160,000) (mass ratio A:B=1:2) was tape-cast on the taut surface of the porous membrane and the solvent was removed by briefly heating a blower. Then the other side of the porous membrane was coated with an ethanol-water solution of 14% perfluorosulfonic acid resin, wherein the perfluorosulfonic acid resin has a structural formula as:

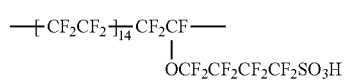

(number average molecular weight: 250,000). The ethanol-water solution was allowed to completely penetrate into the pores of the polytetrafluoroethylene membrane to reach the continuous resin layer at the first surface directly, and then a sample of the wet membrane was dried at 150° C. for 20 minutes in an oven to obtain a composite membrane.

Example 8

The first surface of a chqistex polytetrafluoroethylene membrane (bought in Ningbo) with a thickness of 80 μm, a porosity of 75% and a pore size of 4 μm which was grafted with

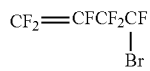

according to the grafting method in Example 1 was coated with a methanol-water solution containing 0.01% manganese sulfate, a trace of perfluorinated malonyl peroxide and 10% mixed perfluorosulfonic acid resin, wherein the mixed perfluorosulfonic acid resin was prepared by mixing the two resins below at a mass ratio of A:B=2:1, where the resin A comprises a repeating unit (a):

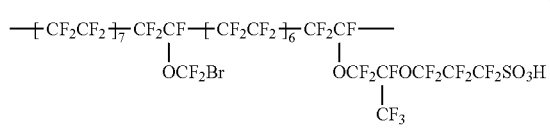

(number average molecular weight: 160,000) and the resin B comprises a repeating unit formula (b):

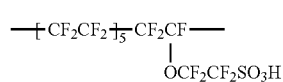

(number average molecular weight of 250,000) at a mass ratio of 3:1,

Then the solvent was removed from the wetted polytetrafluoroethylene membrane by briefly heating a blower. In order to form a continuous layer of the ion exchange resin on the surface of the polytetrafluoroethylene membrane, this process were required to be repeated for more than two times. The membrane was then heated at 150° C. for 2 minutes to obtain a composite membrane.

Example 9

A polytetrafluoroethylene membrane with a thickness of 18 μm, a porosity of 80%, and a pore size of 0.5~3 μm which was grafted with

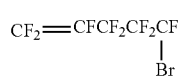

according to the grafting method in Example 1 was tiled on a plate.

Then a DMF solution containing 20% mixed perfluorosulfonic acid resins, wherein the perfluorosulfonic acid resin A comprises a repeating unit (a):

(a)

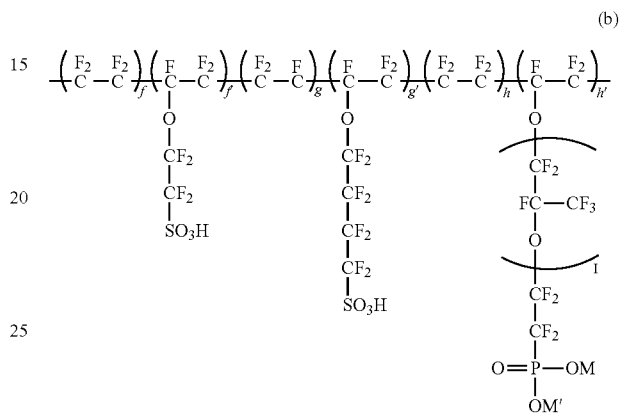

(number average molecular weight: 160,000) and the resin B comprises a repeating unit (b), (b)

(f=10, g=5, h=3, f'=g'=h'=1, i=0, M, M'=H, number average molecular weight: 210,000) (mass ratio of the resin A to resin B is 1:1), 0.02% cerium-18-crown-6 complex and a trace of perfluorinated malonyl peroxide, was tape-cast on the above-mentioned modified polytetrafluoroethylene membrane to perform lamination.

Then the laminated membrane was dried at 240° C. for 2 minutes in an oven to obtain a composite membrane.

Example 10

A propanol-water solution containing 0.03% bipyridine-Ru complex, a trace of perfluorinated malonyl peroxide and 15% perfluorinated sulfonic acid resin comprising a repeating unit as:

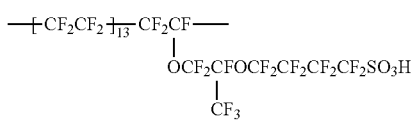

(number average molecular weight: 250,000) was sprayed onto a polytetrafluoroethylene membrane with a thickness of 10 μm, a porosity of 85% and a pore size of 0.5 μm which was grafted with

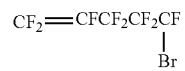

according to the grafting method in Example 1.

Then a sample of the wet membrane was dried at 140° C. for 30 seconds in an oven. In order to block the pores in the membrane completely, this step may be repeated for more than two times. Finally, the composite membrane was processed at 150° C. for 30 minutes to obtain a membrane with a thickness of 20 μm.

Example 11

A (n-)propanol-water solution containing 15% mixed perfluorosulfonic acid resins prepared by mixing resin A comprising a repeating unit (a):

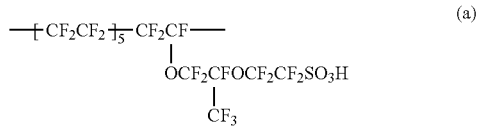

(number average molecular weight: 260,000) and resin B comprising a repeating unit (b):

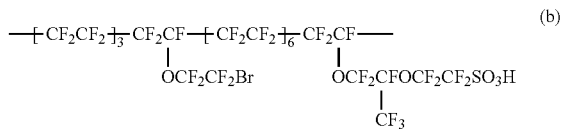

(number average molecular weight: 170,000) and a trace of benzoyl peroxide was sprayed onto a chqistex polytetrafluoroethylene membrane (bought in Ningbo) with a thickness of 10 μm, a porosity of 80% and a pore size of 0.5 μm which was grafted with

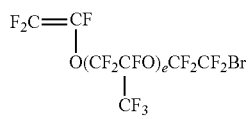

(wherein e=1) according to the grafting method in Example 1.

Then a sample of the wet membrane was dried at 140° C. for 15 minutes in an oven. In order to block the pores in the membrane completely, this step may be repeated for more than two times. Finally, the composite membrane was treated at 150° C. for 30 minutes to obtain a membrane with a thickness of 20 μm.

Example 12

An isopropanol-(n-)propanol-water solution containing 15% perfluorosulfonic acid resin, the structural formula as

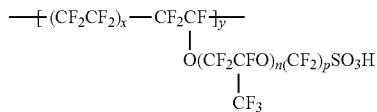

(x is about 5, n=0, p=4, exchange capacity: 1.18 mmol/g; molecular weight: 230,000), was prepared.

Then a tetrafluoroethylene membrane with a thickness of 20 μM, a porosity of 90% and a pore size of 2~3 μm was adopted to obtain a membrane with a thickness of 20 μm according to the screen printing method by using the above-mentioned isopropanol-(n-)propanol-water solution.

Example 13

Preparation and Characterization of Fuel Cell Membrane Electrode Assembly

Preparation of Gas Diffusion Layer (GDL):

Torry090 carbon paper was impregnated in a 25% PTFE emulsion for an appropriate period of time, followed by hydrophobic treatment. The amount of the impregnated PTFE was determined by weighing method. Then the carbon paper impregnated with PTFE was placed in a muffle furnace and roasted at 340° C. so as to remove the surfactant in the PTFE emulsion impregnated in the carbon paper and also make the PTFE thermally melted and sintered and dispersed uniformly on the fibers of the carbon paper, and thereby to achieve a good hydrophobic effect. The mass fraction of PTFE in the roasted carbon paper was about 30%. A certain amount of carbon powder, PTFE, and an appropriate amount of isopropanol aqueous solution were mixed, oscillated with ultrasonic wave for 15 minutes, and then coated onto the carbon papers by adopting brush coating process, and the coated carbon papers were roasted at 340° C. for 30 minutes, respectively, to prepare a gas diffusion layer.

Preparation of Membrane Electrode Assembly (MEA):

the amount of Pt loaded in the catalyst layer was 0.4 mg/cm$^2$; a certain amount of 40% Pt/C (JM Company) electrocatalyst, deionized water and isopropanol were mixed, oscillated with ultrasonic wave for 15 minutes; after adding a certain amount of 5% resin solution of Example 12, ultrasonic oscillation was proceeded for another 15 minutes; after the solution turned ito an ink-like solution through ultrasonic processing, the mixed solution was sprayed onto the membrane of Example 2 uniformly to obtain an Membrane Electrode Assembly (MEA).

The prepared membrane electrode assembly and the leveled gas diffusion layer were combined to assemble a single cell, and galvanostatic polarization performance test was performed in a self-designed dual-channel low-power testing platform under test conditions as follows: effective active area of a single cell was 50 cm$^2$, pressures of $H_2$ and air were both 1.0 bar, $H_2$ utilization rate was 70%; air utilization rate was 40%; relative humidity was 50%; and cell operating temperature was (95° C. The polarization curve test was performed after the prepared electrode was activated, and the data were recorded at an interval of 1 minute after the respective measuring points were stabilized for 2 minutes so as to draw a polarization curve (FIG. 3).

Example 14

This example is used to illustrate respective performances of the composite membranes prepared in Examples 1-12.

The performances of all the membranes were characterized and the results are shown in Table 1. It can be seen from Table 1 that the electrical conductivity at 95° C., tensile strength, hydrogen permeation current, dimensional change rate, and other performances of the composite membrane of the present invention are all superior to those of an ordinary composite ion membrane. The test conditions of the electrical conductivity value are as follows: T=95° C., under saturated humidity; and T=25° C., dried in a drier for two days; the method for testing the tensile strength was a GB standard method (GB/T20042.3-2009), and the method for testing the hydrogen permeation current was an electrochemical method (Electrochemical and Solid-State Letters, 10, 5, B101-B104 2007)

TABLE 1

Characteristics of various membranes

| | Nos. | Testing Condition and Method | Results |
|---|---|---|---|
| Electrical Conductivity (S/cm) | Membrane of Example 11 | T = 95° C., under saturated humidity/ T = 25° C., dried in a drier for two days | 0.0276/0.0131 |
| | Membrane of Example 12 | | 0.0216/0.0041 |
| | Membrane of Example 1 | | 0.0285/0.0109 |
| | Membrane of Example 2 | | 0.0277/0.0133 |
| | Membrane of Example 3 | | 0.0296/0.0114 |
| | Membrane of Example 4 | | 0.0289/0.0116 |
| | Membrane of Example 5 | | 0.0302/0.0121 |
| | Membrane of Example 6 | | 0.0311/0.0131 |
| | Membrane of Example 7 | | 0.0312/0.0121 |
| | Membrane of Example 8 | | 0.0321/0.0141 |
| | Membrane of Example 9 | | 0.0331/0.0131 |
| | Membrane of Example 10 | | 0.0331/0.0131 |
| Tensile Strength (MPa) | Membrane of Example 11 | GB standard method (GB/T20042.3-2009) | 32 |
| | Membrane of Example 12 | | 28 |
| | Membrane of Example 1 | | 35 |
| | Membrane of Example 2 | | 33 |
| | Membrane of Example 3 | | 34 |
| | Membrane of Example 4 | | 35 |
| | Membrane of Example 5 | | 36 |
| | Membrane of Example 6 | | 38 |
| | Membrane of Example 7 | | 37 |
| | Membrane of Example 8 | | 35 |
| | Membrane of Example 9 | | 34 |
| | Membrane of Example 10 | | 39 |
| Hydrogen Permeation Current (mA/cm$^2$) | Membrane of Example 11 | Electrochemical method | 1.8 |
| | Membrane of Example 12 | | >4 |
| | Membrane of Example 1 | | 0.12 |
| | Membrane of Example 2 | | 0.12 |
| | Membrane of Example 3 | | 0.09 |
| | Membrane of Example 4 | | 0.11 |
| | Membrane of Example 5 | | 0.11 |
| | Membrane of Example 6 | | 0.10 |
| | Membrane of Example 7 | | 0.07 |
| | Membrane of Example 8 | | 0.09 |
| | Membrane of Example 9 | | 0.06 |
| | Membrane of Example 10 | | 0.12 |
| Dimensional Change Rate (%) | Membrane of Example 11 | (GB/T20042.3-2009) | 3.5 |
| | Membrane of Example 12 | | 8.9 |
| | Membrane of Example 1 | | 1.0 |
| | Membrane of Example 2 | | 1.2 |
| | Membrane of Example 3 | | 0.9 |
| | Membrane of Example 4 | | 1.2 |
| | Membrane of Example 5 | | 1.2 |
| | Membrane of Example 6 | | 2.1 |
| | Membrane of Example 7 | | 1.2 |
| | Membrane of Example 8 | | 1.0 |
| | Membrane of Example 9 | | 1.3 |
| | Membrane of Example 10 | | 1.2 |

The invention claimed is:

1. A method for preparing a composite material, the method comprising:
   (1) compounding a dispersion solution of an ion exchange resin containing a free radical initiator and a high-valence metal compound, with a functional monomer-grafted porous fluoropolymer membrane with a microporous structure by performing solution pouring, tape casting, screen printing process, spraying, or impregnating process;
   (2) subjecting a wet membrane to heat treatment at from 30 to 300° C., wherein the free radical initiator initiates a crosslinking reaction between the porous membrane and the resin to obtain the composite material;
   wherein a solvent used in the processes of solution pouring, tape casting, screen printing, spraying, impregnating and other processes, is selected from one or more of a group consisting of dimethylformamide, dimethylacetamide, methylformamide, dimethylsulfoxide, N-methylpyrrolidone, hexamethylphosphoric acid amine, acetone, water, ethanol, methanol, n-propanol, isopropanol, ethylene glycol and/or glycerol; preparation is performed under the following conditions: concentration of the resin dispersion solution from 1 to 80%, temperature of heat treatment from 30 to 300° C., and time of heat treatment from 1 to 600 minutes; the acidic crosslinking catalyst is added in an amount of from 0.1 to 1 wt % of the resin,
   wherein the ion exchange resin is prepared by copolymerization of fluorine-containing olefins, fluorine-containing olefin monomers comprising a functional group and fluorine-containing olefin monomers containing a crosslinking site and/or mixtures of the above-obtained copolymers, and has an EW value of from 600 to 1,300; the number average molecular weight of said resin is from 150,000 to 450,000;
   wherein the fluorine-containing olefin monomer containing a functional group is one or more selected from a group consisting of substances as defined in the following formula (II) and/or formula (III) and/or formula (IV)

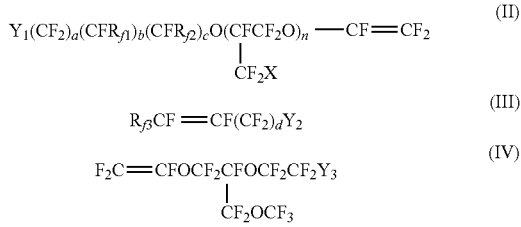

wherein a, b, c are an integer of 0 or 1, respectively, but a, b and c are not zero at the same time;

d is an integer of from 0 to 5; n is 0 or 1;

$R_{f1}$, $R_{f2}$, $R_{f3}$ are selected from perfluorinated alkyl or chlorofluorinated alkyl, respectively;

X is selected from F or Br;

$Y_1$, $Y_2$, $Y_3$ are selected from $SO_2M$, $COOR_3$ or $PO(OR_4)(OR_5)$, respectively, wherein M is selected from F, Cl, OR, or $NR_1R_2$; R is selected from methyl, ethyl or propyl, or selected from H, Na, Li, K or ammonium; $R_1$ and $R_2$ are selected from H, methyl, ethyl or propyl, respectively; $R_3$ is selected from H, Na, Li, K, ammonium, methyl, ethyl or propyl; and $R_4$, $R_5$ are selected from H, Na, Li, K, or ammonium, respectively;

the fluorine-containing olefin monomer containing a crosslinking site is one or more selected from a group consisting of substances as defined in the following formula (V) and formula (VI):

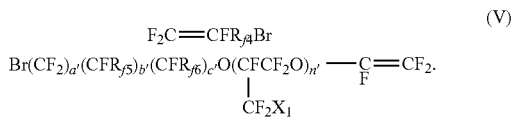

wherein a', b', c' are 0 or 1, respectively, but a'+b'+c'≠0; $X_1$ is selected from F or Br; n' is 0 or 1; and $R_{f4}$, $R_{f5}$, $R_{f6}$ are selected from perfluorinated alkyl, respectively.

2. The method for preparing a composite material according to claim 1, wherein the free radical initiator is one or more selected from the group consisting of organic peroxide initiators and/or azo initiators.

3. The method for preparing a composite material according to claim 2, wherein the organic peroxide initiator is the initiator as defined in the following formula (VIII) and/or formula (IX):

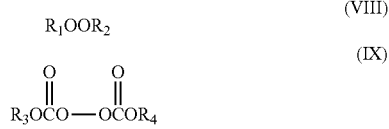

$R_1$, $R_2$ are selected from but not limited to the following groups, respectively: H, $C_1$~$C_{20}$ alkyl or aryl-substituted alkyl, $C_1$~$C_{20}$ acyl, $C_1$-$C_{20}$ aroyl, $C_1$~$C_{20}$ fluorinated alkyl or perfluorinated alkyl or aryl substituted alkyl, $C_1$~$C_{20}$ fluorinated acyl or perfluorinated acyl, and/or $C_1$~$C_{20}$ fluorinated aroyl or perfluorinated aroyl; but $R_1$ and $R_2$ are not H at the same time;

$R_3$, $R_4$ are selected from but not limited to the following groups, respectively: $C_1$~$C_{20}$ alkyl or aryl-substituted alkyl and/or $C_1$~$C_{20}$ fluorinated alkyl or perfluorinated alkyl or aryl substituted alkyl.

4. The method for preparing a composite material according to claim 2, wherein the organic peroxide initiator is an organic perfluorinated peroxide.

5. The method for preparing a composite material according to claim 2, wherein the azo initiator is selected from but not limited to the following initiators: azodicarbonamide, azobisisobutyronitrile, azobisisovaleronitrile, azobisisoheptonitrile, dimethyl 2,2'-azobis(2-methylpropionate), 1-((cyano-1-methylethyl)azo) formamide, 1,1'-azo(cyclohexyl-1-cyano), 2,2'-azobis(2-methylpropionamidine) dihydrochloride, and/or 4,4'-azobis(4-cyanovaleric acid).

6. The method for preparing a composite material according to claim 1, wherein the high-valence metal compound is one or more selected from the group consisting of compounds of the following elements: W, Zr, Ir, Y, Mn, Ru, Ce, V, Zn, Ti, and La.

7. The method for preparing a composite material according to claim 1, wherein the high-valence metal compound is selected from the group consisting of nitrates, sulfates, carbonates, phosphates, acetates of these metal elements in the highest valence state and intermediate valence state or double salts thereof; or one or more selected from a group consisting of cyclodextrins, crown ethers, acetylacetones, aza crown ethers and nitrogen heterocyclic rings, EDTA, DMF, and DMSO complexes of these metal elements in the highest valence state and intermediate valence state; or one or more selected from a group consisting of hydroxides of these metal elements in the highest valence state and intermediate valence state; or selected from a group consisting of oxides of these metal elements in the highest valence state and intermediate valence state which have a perovskite structure, including but not limited to the following compounds: $Ce_xTi_{(1-x)}O_2$ (x is from 0.25 to 0.4), $Ca_{0.6}La_{0.27}TiO_3$, $La_{(1-y)}Ce_yMnO_3$ (y is from 0.1 to 0.4) and $La_{0.7}Ce_{0.15}Ca_{0.15}MnO_3$.

8. The method for preparing a composite material according to claim 1, wherein part of acidic exchange groups of the ion exchange resin form physical bonding in between through the high-valence metal compound.

9. The method for preparing a composite material according to claim 1, wherein the EW value is from 700 to 1,200.

10. The method for preparing a composite material according to claim 1, wherein the fluorine-containing olefin is one or more selected from the group consisting of tetrafluoroethylene, chlorotrifluoroethylene, trifluoroethylene, hexafluoropropylene and/or vinylidene fluoride.

11. The method for preparing a composite material according to claim 1, wherein said fluorine-containing olefin is tetrafluoroethylene and/or chlorotrifluoroethylene.

12. The method for preparing a composite material according to claim 1, wherein the porous fluoropolymer membrane is selected from the group consisting of porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane, which are uniaxial tensile membranes or biaxial tensile membranes.

13. The method for preparing a composite material according to claim 12, wherein the porous fluoropolymer membrane has a thickness of no greater than 100 μm, a porosity from 50 to 97% and a pore size of from 0.1 to 10 μm.

14. The method for preparing a composite material according to claim 13, wherein the porous fluoropolymer membrane has a thickness of from 5 to 20 μm, a porosity of from 60 to 97% and a pore size of from 0.2 to 5 μm.

15. The method for preparing a composite material according to claim 1, wherein the functional monomers are bromine-containing functional monomers.

16. The method for preparing a composite material according to claim 15, wherein the bromine-containing functional monomers are selected one or more combinations from substances as defined in the following formula (V) and/or formula (VI):

 (V)

 (VI)

wherein a', b', c' are 0 or 1, respectively, but a'+b'+c'≠0; n' is 0 or 1; $X_1$ is selected from F or Br; and $R_{f4}$, $R_{f5}$, $R_{f6}$ are selected from fluorine or perfluorinated alkyl, respectively.

17. The method for preparing the composite material according to claim 1, wherein the preparation is performed under the following conditions: concentration of the resin dispersion solution from 5 to 40%, a temperature of heat treatment from 120 to 250° C., and a time of heat treatment from 5 to 200 minutes.

18. The method for preparing the composite material according to claim 1, wherein the high-valence metal compound is added in an amount of from 0.0001 to 5 wt %.

19. The method for preparing the composite material according to claim 1, wherein the high-valence metal compound is added in an amount of from 0.001 to 1 wt %.

20. A composite material prepared by the method according to claim 1 and an ion exchange membrane comprising the composite material and a fuel cell comprising the ion exchange membrane.

* * * * *